United States Patent
Mankaruse et al.

(10) Patent No.: US 8,244,310 B2
(45) Date of Patent: Aug. 14, 2012

(54) MOBILE COMMUNICATION DEVICE EMPLOYING POWER PACK WITH MULTIPLE PAIRS OF TAPS

(75) Inventors: George Soliman Mankaruse, Waterloo (CA); Lizhong Zhu, Waterloo (CA); Michael Stephen Corrigan, Waterloo (CA)

(73) Assignee: Research In Motion Limited, Waterloo (CA)

( * ) Notice: Subject to any disclaimer, the term of this patent is extended or adjusted under 35 U.S.C. 154(b) by 257 days.

(21) Appl. No.: 12/706,490

(22) Filed: Feb. 16, 2010

(65) Prior Publication Data

US 2011/0201391 A1    Aug. 18, 2011

(51) Int. Cl.
*H04B 1/38* (2006.01)
*H04B 1/00* (2006.01)

(52) U.S. Cl. .... 455/572; 455/573; 455/63.1; 455/114.2; 455/343.1

(58) Field of Classification Search .............. 455/572, 455/573, 63.1, 114.2, 343.1
See application file for complete search history.

(56) References Cited

U.S. PATENT DOCUMENTS

| | | | | |
|---|---|---|---|---|
| 5,170,494 A | * | 12/1992 | Levanto | 455/575.9 |
| 5,628,054 A | * | 5/1997 | Osaka | 455/573 |
| 5,942,951 A | * | 8/1999 | Brady | 331/108 D |
| 6,157,593 A | | 12/2000 | Costa et al. | |
| 6,215,274 B1 | | 4/2001 | Dotzler | |
| 2007/0003088 A1 | | 1/2007 | Lehtola | |
| 2009/0143111 A1 | * | 6/2009 | Oglesbee et al. | 455/572 |

FOREIGN PATENT DOCUMENTS

DE    102005030123 A1    1/2007
EP    1445780 A1    8/2004

OTHER PUBLICATIONS http://www.iwpc.org/Workshop_Folders/08_09_Power_Mgt/Ext_Battery_Life_Sept_08.htm.
http://cat.inist.fr/?aModele=afficheN&cpsidt=16607507.
EPO, Extended European Search Report dated Jul. 9, 2010 regarding application No. 10153696.9.

\* cited by examiner

*Primary Examiner* — Wen Huang
(74) *Attorney, Agent, or Firm* — Ridout & Maybee LLP

(57) ABSTRACT

A mobile communication device has a power amplifier and a power pack. The power pack includes a charge storage component, a first pair of taps connected to the charge storage component for supplying power to components of the mobile communication device and a second pair of taps connected to the charge storage component for supplying power to the power amplifier, the second pair of taps located, when the power is installed in the mobile communication device, more proximate to the power amplifier than the first pair of taps. With the second pair of taps positioned more proximate to the power amplifier, the power amplifier current loop that includes the multi-tap power pack may be made smaller. One benefit of a smaller power amplifier current loop may be reduced emission of RF interference signals.

11 Claims, 7 Drawing Sheets

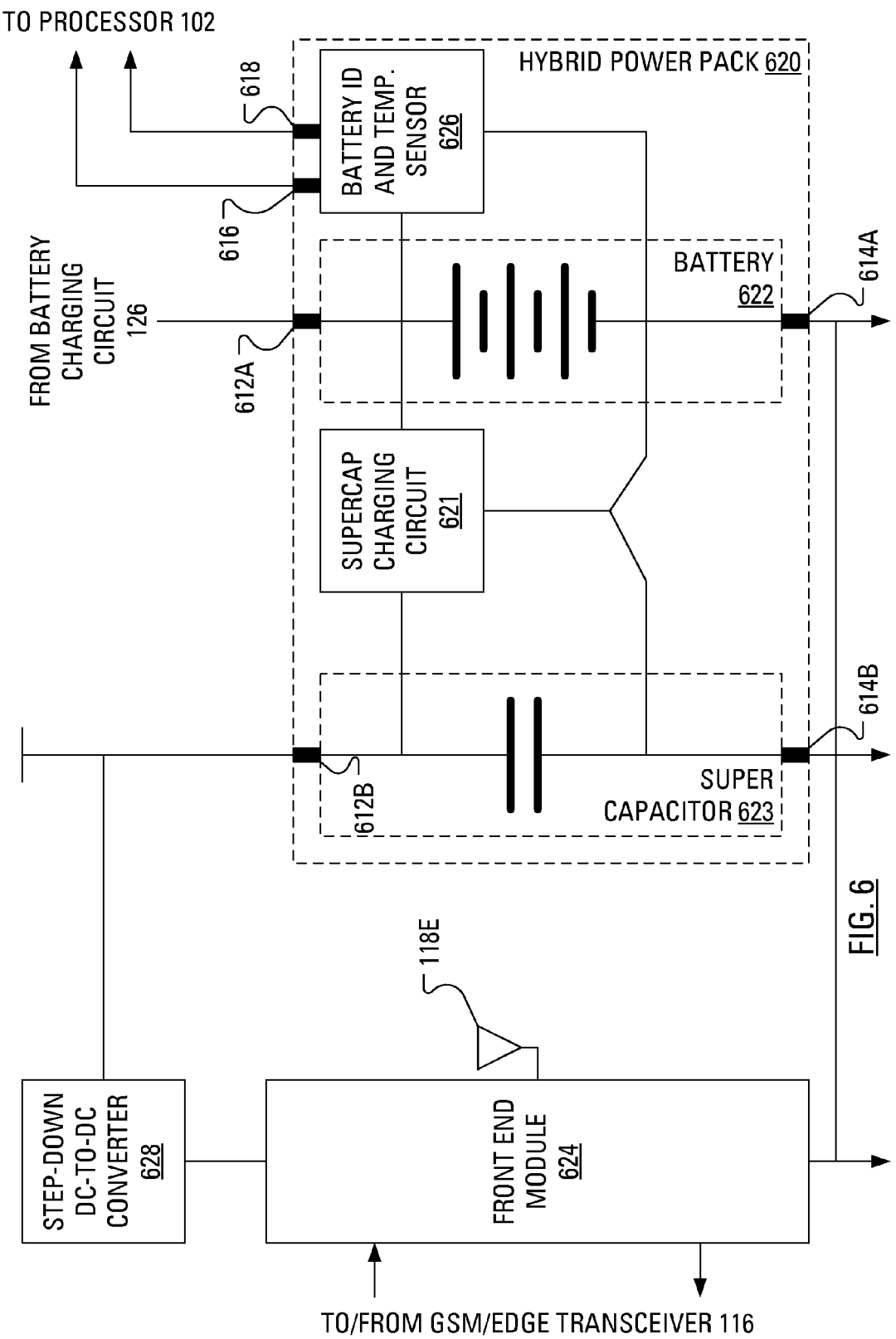

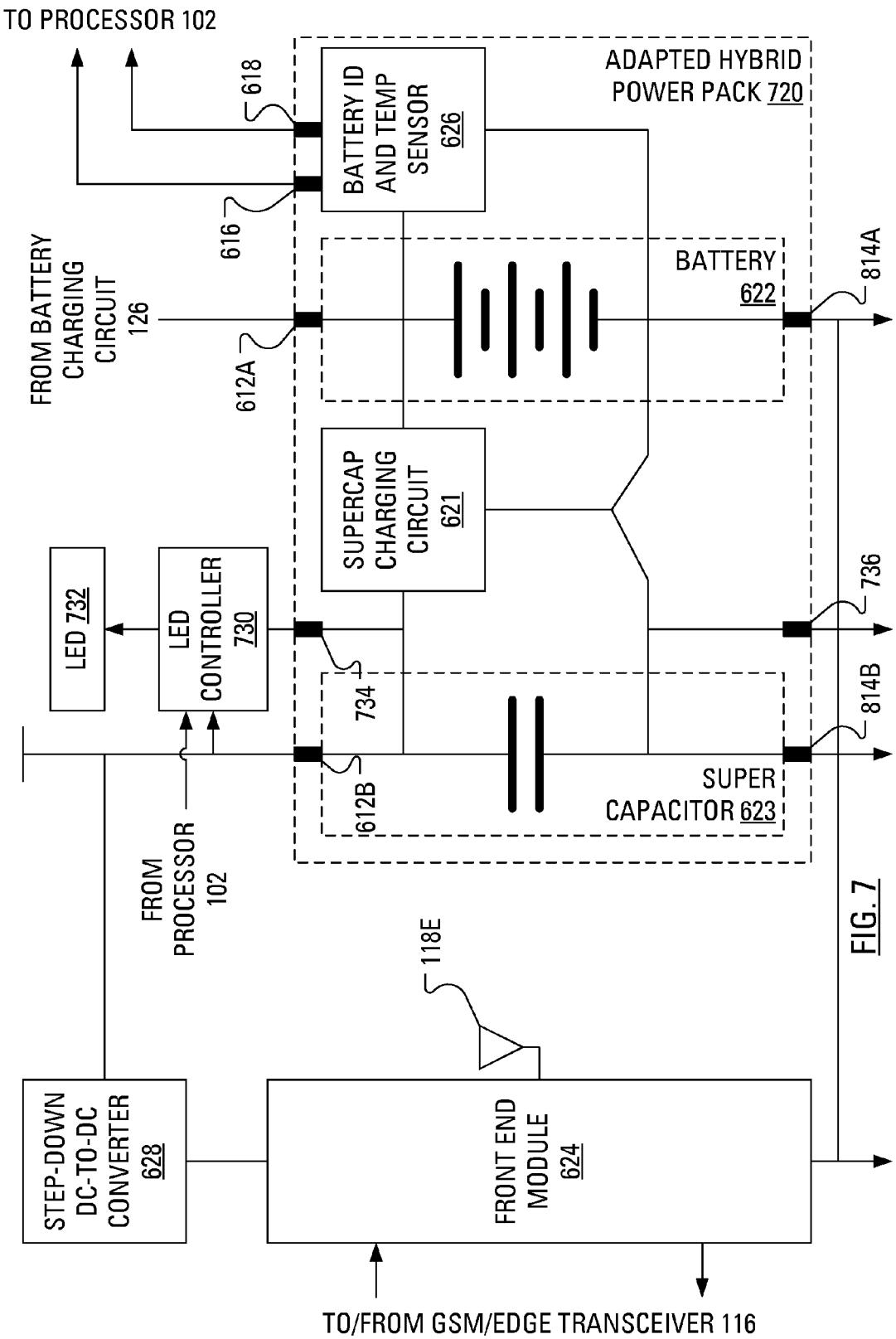

MOBILE COMMUNICATION DEVICE EMPLOYING POWER PACK WITH MULTIPLE PAIRS OF TAPS

FIELD

The present application relates generally to a power pack for a mobile communication device and, more specifically, to a mobile communication device employing a power pack with multiple pairs of taps.

BACKGROUND

In a power distribution network with a power pack (such as a battery) having a charge storage component, ripple in the power supply voltage may result from pulsed high-current draw by a radio frequency power amplifier circuit, for example. Propagation of the ripple to other components relying on the power distribution network may cause undesirable effects. For an audio circuit, for example, the ripple may cause an audible buzz. Additionally, certain arrangements of the power pack relative to the power amplifier circuit may allow for generation of significant electromagnetic interference.

BRIEF DESCRIPTION OF THE DRAWINGS

Reference will now be made to the drawings, which show by way of example, embodiments of the present disclosure, and in which:

FIG. 6 schematically illustrates a front end module for use in a power distribution network, with power supplied by a hybrid power pack with a supercapacitor and a battery; and FIG. 7 schematically illustrates a front end module for use in a power distribution network, the power distribution network including additional components and with power supplied by an adapted version of the hybrid power pack of FIG. 6, where the adapted power pack includes taps allowing the supercapacitor to supply power to the additional components.

DETAILED DESCRIPTION OF THE EMBODIMENTS

A power pack for a mobile communication device includes a charge storage component and multiple pairs of taps for supplying power a) to components of the mobile communication device and b) to a power amplifier. The pair of taps supplying power to the power amplifier may be located more proximate to the power amplifier than the other pair of taps, thereby allowing for a power amplifier current loop smaller than a power amplifier current loop that exists for a power pack with only a single pair of taps.

In accordance with an aspect of the present application, there is provided a mobile communication device. The mobile communication device includes a power amplifier and a power pack. The power pack includes a charge storage component, a first pair of taps, connected to terminals of the charge storage component, for supplying power to at least an audio circuit of the mobile communication device and a second pair of taps, connected to terminals of the charge storage component, for supplying power to the power amplifier, the second pair of taps located, when the power is installed in the mobile communication device, more proximate to the power amplifier than the first pair of taps.

Other aspects and features of the present invention will become apparent to those of ordinary skill in the art upon review of the following description of specific embodiments of the invention in conjunction with the accompanying figures.

Figure 1:
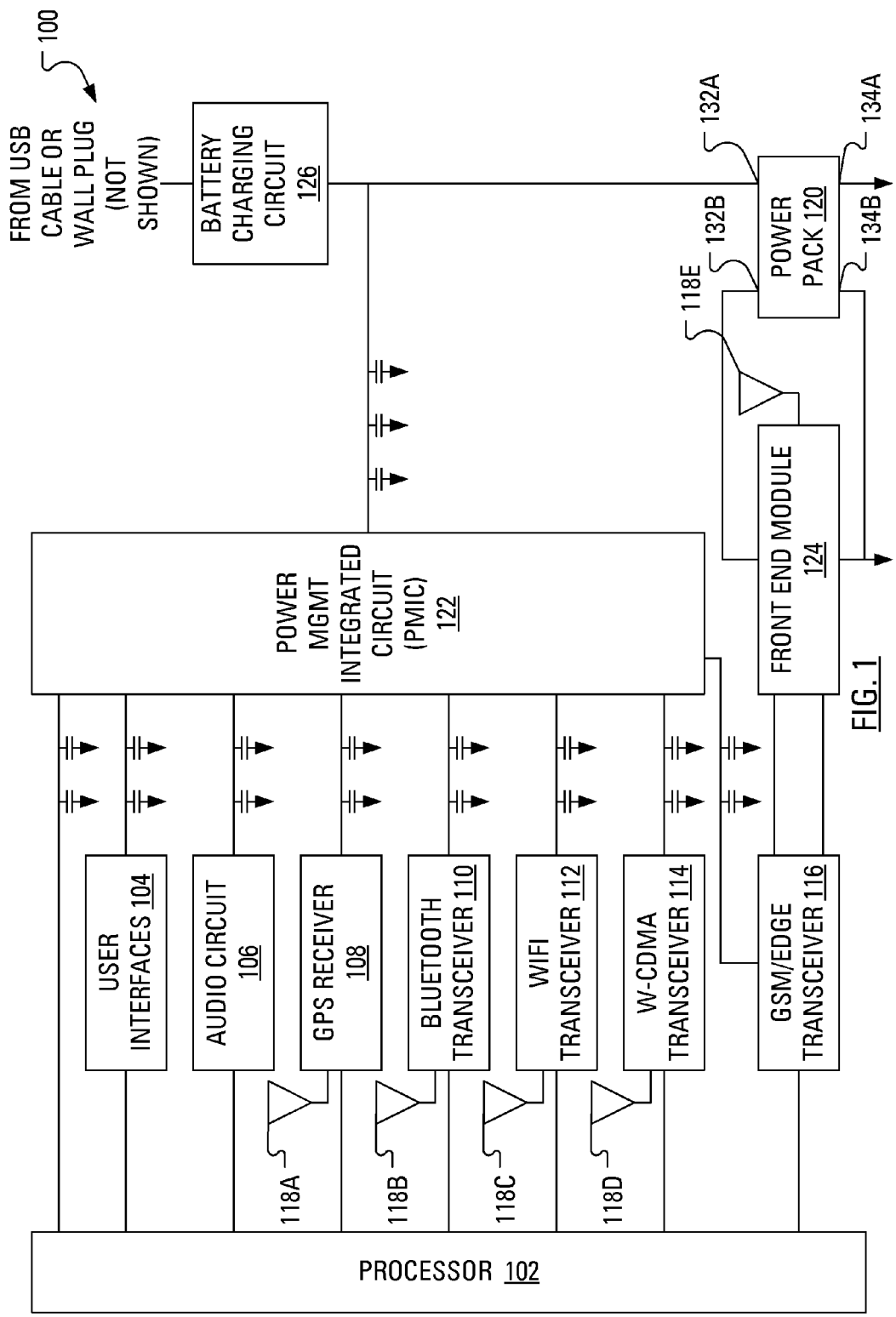
FIG. 1 illustrates a power distribution network with a front end module, containing a power amplifier, and a power pack.

FIG. 1 illustrates a power distribution network 100 with a front end module (FEM) 124 and a single power pack 120. The power pack 120 includes a charge storage component. As will be discussed below, the charge storage component may be any component that stores electrical charge, such as a chemical power cell or a supercapacitor. The power distribution network 100 is arranged for use in a mobile communication device. The mobile communication device includes a processor 102 for controlling the overall operation of the mobile communication device, or for controlling selected operations of the mobile communication device. Components of the mobile communication device include a housing (not shown) and multiple user interface components 104. The user interface components 104 may include an input device (e.g., a keyboard having a plurality of keys, a button, a trackball or touchpad) and an output device (e.g., a display), which may comprise a full graphic, or full color, Liquid Crystal Display (LCD). In some embodiments, the display may comprise a touchscreen display. In such embodiments, the keyboard may comprise a virtual keyboard. Other types of output devices may alternatively be utilized. The processor 102 controls the operation of the display, in part, responsive to actuation of the keys on the keyboard by a user of the mobile communication device.

Components of the mobile communication device may also include an audio circuit 106, which may control presentation, to the user, of an audio alert (a ring tone), audio received in a telephone call and audio based on a digital music file saved in device memory (not shown).

Components of the mobile communication device may also include a receiver 108 for use with the known Global Positioning System (GPS). The GPS receiver 108 is illustrated as being communicatively connected to a GPS receiver antenna 118A.

Components of the mobile communication device may also include a transceiver 110 for use in a short-range communications subsystem that enables communication between the mobile communication device and other proximate systems or devices, which need not necessarily be similar devices. For example, the short-range communications subsystem may include an infrared device and associated circuits and components, or a Bluetooth™ communication module to provide for communication with similarly-enabled systems and devices. The Bluetooth transceiver 110 is illustrated as being communicatively connected to a Bluetooth transceiver antenna 118B.

Components of the mobile communication device may also include a transceiver 112 for use in a wireless local area networking communication subsystem. A set of standards has been established by the Institute of Electrical and Electronics Engineers (IEEE) and is known as IEEE 802.11 standards. Products may be certified by the known Wi-Fi Alliance for adherence to the IEEE 802.11 standards. The Wi-Fi transceiver 112 is illustrated as being communicatively connected to a Wi-Fi transceiver antenna 118C.

Components of the mobile communication device may also include a transceiver 114 for use in a first wireless telecommunication subsystem. The first wireless telecommunication subsystem may be based on the known Wideband Code Division Multiple Access (W-CDMA) standard. The W-CDMA transceiver 114 is illustrated as being communicatively connected to a W-CDMA transceiver antenna 118D.

Components of the mobile communication device may also include a transceiver 116 for use in a second wireless telecommunication subsystem. The second wireless telecommunication subsystem may be based on the known Global System for Mobile communications (GSM) and Enhanced Data rates for GSM Evolution (EDGE) standards. The GSM/EDGE transceiver 116 is illustrated as being communicatively connected, through the FEM 124, to a GSM/EDGE transceiver antenna 118E.

The processor 102, the user interfaces 104, the audio circuit 106, the GPS receiver 108, the Bluetooth transceiver 110, the Wi-Fi transceiver 112, the W-CDMA transceiver 114 and the GSM/EDGE transceiver 116 all maintain a connection to a power management integrated circuit (PMIC) 122. The PMIC 122 and the FEM 124 maintain a connection to the power pack 120. The power pack 120, through a first tap 132A, maintains a connection to a battery charging circuit 126 and, through a second tap 134A, maintains a connection to a power supply reference voltage in common with components of the FEM 124. Another pair of taps includes a third tap 132B connecting the multi-tap power pack 120 to the FEM 124 and a fourth tap 134B connecting the multi-tap power pack 120 to the power supply reference voltage.

The power pack 120 may, for example, house a Li-Ion battery with an operational range of from 4.2V to 3.2V. The concepts described herein are not limited, however, to any particular form of energy storage or battery chemistry.

Figure 2:
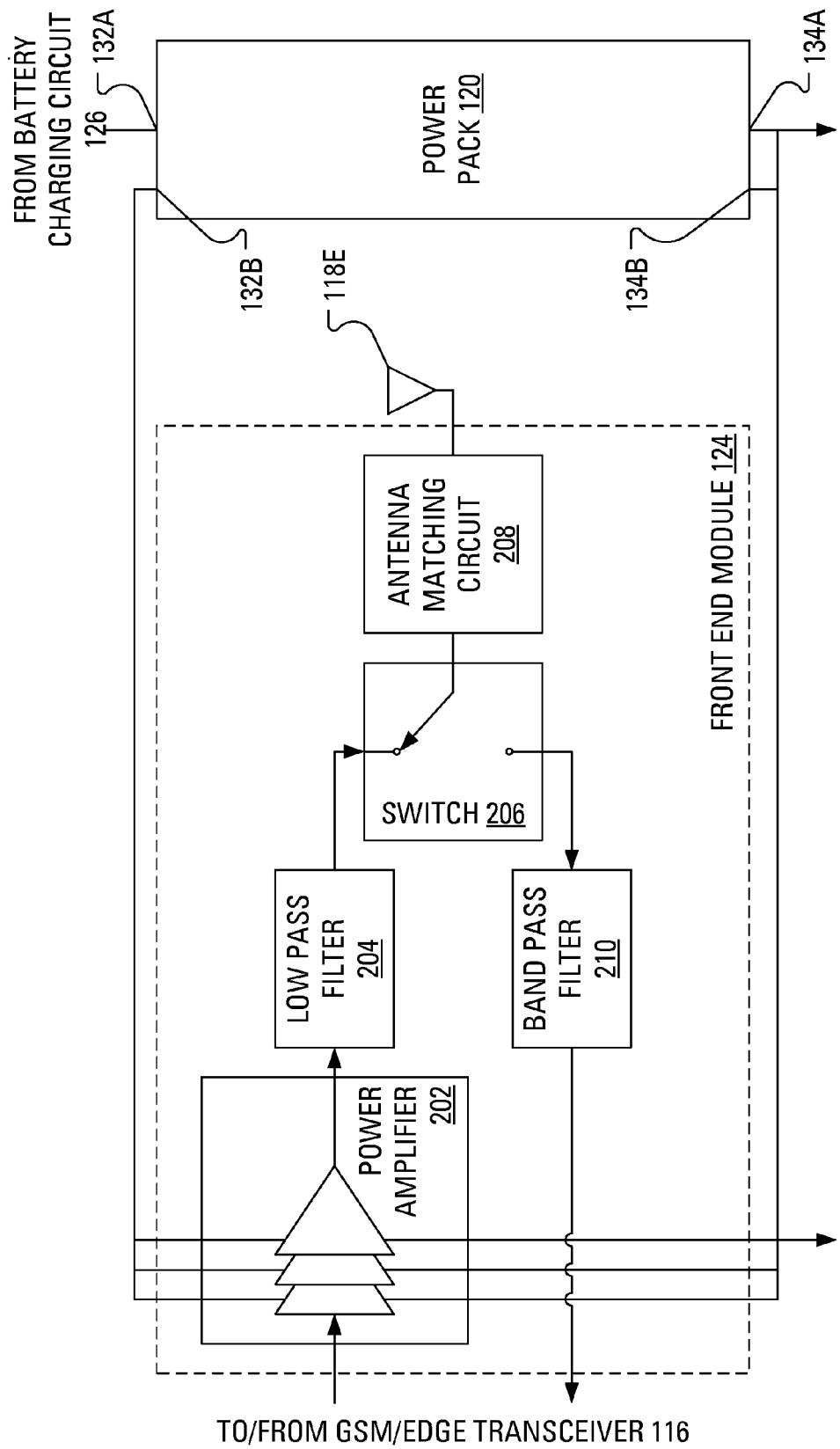
FIG. 2 schematically illustrates the front end module of the power distribution network of FIG. 1.

Components of the FEM 124 of FIG. 1 are illustrated in FIG. 2. The FEM 124 includes (but is not necessarily limited to) a power amplifier 202 that connects to an output of the GSM/EDGE transceiver 116 and to an input to a low pass filter 204. A switch 206 connects, in one state, the output of the low pass filter 204 to an antenna matching circuit 208, which connects to the GSM/EDGE transceiver antenna 118E. In another state, switch 206 connects the output of the antenna matching circuit 208 to an input of a band pass filter 210. The output of the band pass filter 210 connects to an input of the GSM/EDGE transceiver 116.

The power amplifier 202 is illustrated as comprising multiple stages (not individually referenced) with each stage receiving a power supply voltage from the third tap 132B of the power pack 120. Similarly, each stage shares a power supply reference voltage with the fourth tap 134B of the power pack 120.

In operation, the GSM/EDGE transceiver 116 may cause the power amplifier 202 to be operated in a so-called "pulse mode". The pulse mode of power amplifier operation is known to cause variation in the power supply voltage provided at the first terminal 132A of the power pack 120. The variation, or ripple, in the power supply voltage may be as much as 400 mV peak-to-peak due to high pulsed current. Unfortunately, the ripple may propagate from the power pack 120, to the PMIC 122, to the rest of the components. For the audio circuit 106, the ripple may cause an audible buzz (for GSM-based communication devices, many have experienced a buzz at 217 Hz), elimination of which has been perceived as difficult and costly.

A power amplifier current loop may be defined as being formed through the power pack 120 and the power amplifier 202. With the relatively large area of a traditional power amplifier current loop, it may be shown that the pulse mode of power amplifier operation causes measurable magnetic radiation to be emitted. This emission may be shown to interfere with other circuits, such as the circuits found in hearing aids, especially among the circuits found in hearing aids that utilize a T-magnetic coil (or T-coil) to pick up an audio signal. The emission of magnetic radiation from the power amplifier current loop can also be problematic when the radiation couples to various transducers and other components within and/or outside of the enclosure of the mobile communication device to which the power distribution network 100 provides power.

It may be shown that Radio Frequency (RF) interference signals (any unwanted signals) that are present at the power amplifier 202 during transmission may be coupled to other circuits 104, 106, 108, 110, 112, 114, 116, 122, 126 via the power supply lines. If the interference signals become coupled to the power pack 120, for example, it can be shown that those interference signals may be radiated by the power pack 120 due to the battery structure. The battery structure may, for example, involve the first tap 212 (i.e., the positive contact) of the power pack 120 being connected to the mobile communication device housing. In such a case, it may be shown that the mobile communication device housing may behave like an antenna.

Figure 3:
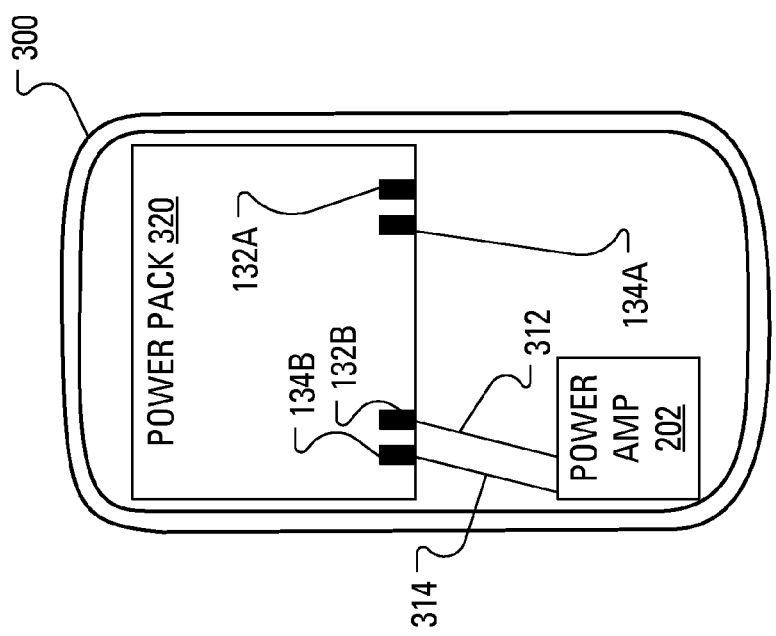
FIG. 3 illustrates a mobile communication device with a battery cover removed to expose the power pack of FIG. 1 and the power amplifier from FIG. 2.

FIG. 3 illustrates a mobile communication device 300 with a battery cover removed to expose the multi-tap power pack 120 (see FIG. 1) and the power amplifier 202 from FIG. 2. A first trace 312 is illustrated connecting the third tap 134B to the power amplifier 202. Similarly, a second trace 314 is illustrated connecting the fourth tap 132B to the power amplifier 202.

FIG. 3 illustrates an example mobile communication device 300 with a battery cover removed to expose the multi-tap power pack 120 and the power amplifier 202 from FIG. 2. A first trace 312 is illustrated connecting the third tap 132B to the power amplifier 202. Similarly, a second trace 314 is illustrated connecting the fourth tap 134B to the power amplifier 202. By contrast a single-tap power pack may have taps 132A and 134A, but not taps 132B and 134B, and traces would connect the power amplifier 202 to taps 132A and 134A. The current loop whereby the power amp 202 would be connected to the power pack 120 by taps 132A and 134A would be different than the current loop that would be formed through connection via taps 132B and 134B. In particular, the latter current loop would be smaller, because taps 132B and 134B are more proximate to the power amp 202 than are taps 132A and 134A. As will be discussed below, a smaller current loop is useful for reducing RF interference. Further, the current loop between the power pack 120 and the power amplifier 202 is not directly electrically coupled to taps 132A and 134A, which may be supplying power to other components.

Figure 4:
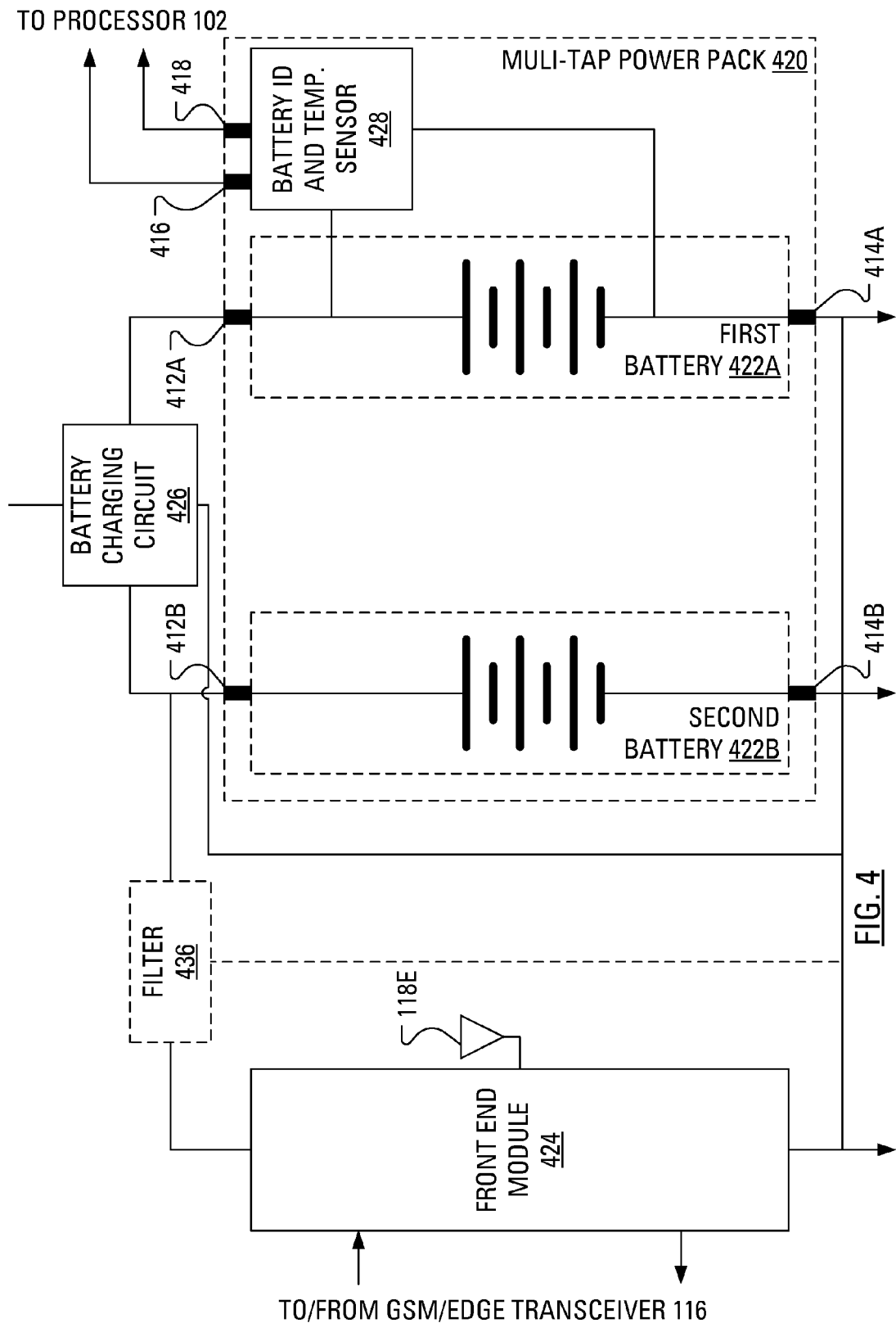
FIG. 4 schematically illustrates a front end module for use in a power distribution network, with power supplied by a multi-tap power pack having multiple batteries.

FIG. 4 shows an example implementation of a power pack 420 with multiple pairs of taps. The multi-tap power pack 420 houses a first rechargeable battery 422A and a second rechargeable battery 422B. The first battery 422A has a first tap 412A connected to a battery charging circuit 426 and a second tap 414A connected to a common supply voltage for the power distribution network. A second tap 414B of the second battery 422B is also connected to the common supply voltage for the power distribution network. A first tap 412B of the second battery 422B is connected to the battery charging circuit 426. The first tap 412B of the second battery 422B is also connected to a front end module (FEM) 424. The FEM 424 is also connected to the common supply voltage. The FEM 424 has a structure (not shown) similar to the structure illustrated in FIG. 2 for the FEM 124. In an alternative implementation, the battery charging circuit 426 is internal to the multi-tap power pack 420 while maintaining all of the connections illustrated in FIG. 4.

The multi-tap power pack 420 includes a battery identifier and temperature sensor 428. The battery identifier and temperature sensor 428 connects to the processor 102 (FIG. 1). The battery identifier portion is adapted to output a signal at a battery ID tap 416. The temperature sensor portion is adapted to output a signal at a temperature tap 418.

Optionally, the circuit of FIG. 4 may include a filter 436 interposed between the first tap 412B of the second battery 422B and the FEM 424. Such a filter may be considered of use to reduce propagation of radio frequency noise from the FEM 424, more particularly, from the power amplifier therein, when the power amplifier is in use. Indeed, noise may originate anywhere in the power distribution network 100.

Instead of merely two charge storage components, the multi-tap power pack 420 may be designed to have three or more charge storage components. Each of the further charge storage components (not shown) may be associated with a particular circuit. For example, a third charge storage component, with corresponding taps, could be associated with a module containing a power amplifier for use with the Wi-Fi transceiver 112.

In this case, the third charge storage component could be selected specific to the power handling needs of the power amplifier for use with the Wi-Fi transceiver 112. For example, the power amplifier for use with the Wi-Fi transceiver 112 may have a peak power draw of only 2.5 W, which is significantly lower than a peak power draw of 12 W, for the power amplifier for use with the GSM/EDGE transceiver 116. Accordingly, the third charge storage component could be selected to be distinct from the second battery 422B. Additionally, a filter in a connection between the third charge storage component and the module containing a power amplifier for use with the Wi-Fi transceiver 112 may be selected to be distinct from the filter 436 in the connection between the second battery 422B and the FEM 424 of FIG. 4.

Figure 5:
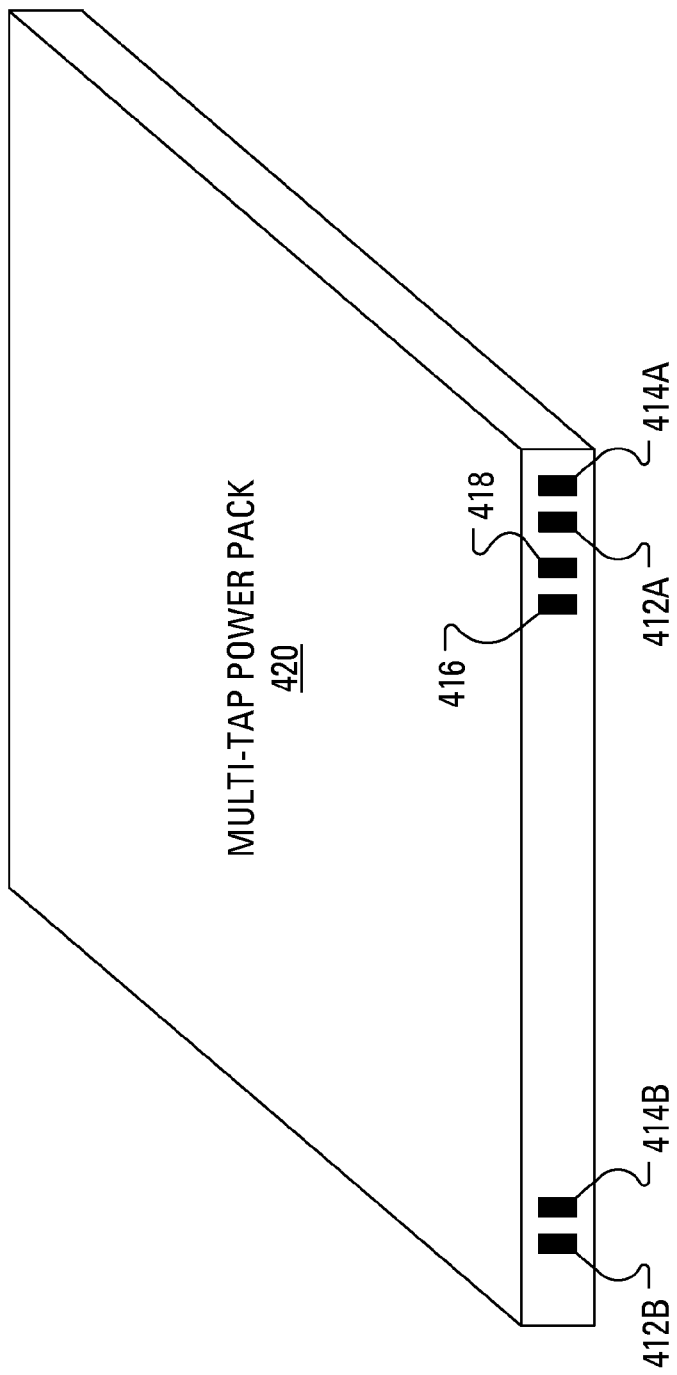
FIG. 5 illustrates the multi-tap power pack of FIG. 4 in perspective view, with proposed locations identified for various taps.

FIG. 5 illustrates the multi-tap power pack 420 in perspective view, with proposed locations identified for the first tap 412A, the second tap 414A, the third tap 412B, the fourth tap 414B, the battery ID tap 416 and the temperature tap 418.

Optionally, the second battery 422B in the multi-tap power pack 420 of FIG. 4 may be replaced with an alternative charge storage component, as illustrated in FIG. 6. In FIG. 6, the FEM 424 receives power from a hybrid power pack 620. The hybrid power pack 620 includes a supercapacitor 623 and a rechargeable battery 622.

In general, a supercapacitor resembles a regular capacitor with the exception that a supercapacitor offers very high capacitance in a small package. Energy storage is accomplished by means of static charge rather than being accomplished by means of an electro-chemical process, such as in the manner of a conventional chemical battery. In common with a regular capacitor, a supercapacitor has a positive plate and a negative plate. By applying a voltage differential to the positive and negative plates, a charge may be stored in the supercapacitor. Whereas a regular capacitor typically includes conductive foils and a dry separator, the supercapacitor typically includes special electrodes and an electrolyte.

The known Part No. EDLC152344-551-2F-30 by TDK of Nihombashi, Chuo, Tokyo, Japan is an example of a component that may be used for the supercapacitor 623. Specifications of this example component include: dimensions 23×44×1.5 mm; rated voltage—4.2V continuous bias, 5.7V intermittent bias; and nominal capacitance 550 mF. The concepts described herein are not limited, however, to any particular supercapacitor, or any particular capacitance, or any particular structure for charge storage or charge separation.

In common with the first battery 422A of the multi-tap power pack 420, the battery 622 of the hybrid power pack 620 has a first tap 612A connected to the battery charging circuit 126 and a second tap 614A connected to a common supply voltage for the power distribution network. A second tap 614B of the supercapacitor 623 is also connected to the common supply voltage for the power distribution network. A first tap 612B of the supercapacitor 623 and the first tap 612A of the battery 622 are connected to, and interposed by, a supercapacitor charging circuit 621. A step-down DC-to-DC converter 628 connects to the first tap 612B of the supercapacitor 623 to the FEM 424.

The supercapacitor charging circuit 621 may be implemented as a standard switched power supply, which can be a step up converter or a step down converter with a predetermined charging current.

The hybrid power pack 620 includes a battery identifier and temperature sensor 626. The battery identifier and temperature sensor 626 connects to the processor 102 (FIG. 1). The battery identifier portion is adapted to output, at a battery ID tap 616, an identification of the hybrid power pack 620. The temperature sensor portion is adapted to sense a temperature within the hybrid power pack 620 and provide an output signal, at a temperature tap 618, indicative of the temperature to the processor 102.

The hybrid power pack 620 of FIG. 6 may be adapted to have an additional pair of taps for supplying power to additional components of the mobile communication device. An adapted hybrid power pack 720 is illustrated in FIG. 7.

In common with the hybrid power pack 620 of FIG. 6, the battery 622 of the adapted hybrid power pack 720 has the first tap 612A connected to the battery charging circuit 126 (FIG. 1) and the second tap 614A connected to a common supply voltage for the power distribution network. The second tap 614B of the supercapacitor 623 is also connected to the common supply voltage for the power distribution network. Just as in the circuit of FIG. 6, the first tap 612B of the supercapacitor 623 and the first tap 612A of the battery 622 are connected to, and interposed by, the supercapacitor charging circuit 621. The step-down DC-to-DC converter 628 connects to the first tap 612B of the supercapacitor 623 and to the FEM 424.

Just as with the hybrid power pack 620 of FIG. 6, the adapted hybrid power pack 720 includes the battery identifier and temperature sensor 626. The battery identifier and temperature sensor 626 connects to the processor 102 (FIG. 1). The battery identifier portion is adapted to output, at the battery ID tap 616, an identification of the adapted hybrid power pack 720. The temperature sensor portion is adapted to sense a temperature within the adapted hybrid power pack 720 and provide an output signal, at the temperature tap 618, indicative of the temperature to the processor 102.

The circuit of FIG. 7 includes additional components that may be found in mobile communication devices. The additional components include a Light Emitting Diode (LED) 732. Associated with, and connected to, the LED 732 is a controller 730. The controller 730 connects to a fifth tap 734 of the adapted hybrid power pack 720, where the fifth tap 734 is connected to the same terminal of the supercapacitor 623 that is connected to the third tap 612B. Additionally, the controller 730 connects to the processor 102 (FIG. 1). Paired with the fifth tap 734 is a sixth tap 736, where the sixth tap 736 is connected to the same terminal of the supercapacitor 623 that is connected to the fourth tap 614B.

In overview, at least the second set of taps (132B, 134B, FIG. 1) may be included at the power pack 120 to form the multi-tap power pack 120. Where the second set of taps (132B, 134B) are positioned more proximate to the power amplifier 202, the power amplifier current loop that includes the multi-tap power pack 120 of FIG. 1 may be made smaller than the power amplifier current loop that includes the power pack 120 of FIG. 1. One of the benefits of a smaller power amplifier current loop may be reduced emission of RF interference signals.

The FEM 124 of FIG. 1 is arranged so that, in operation, the FEM 124 receives a signal from the GSM/EDGE transceiver 116 for transmission on the GSM/EDGE transceiver antenna 118E. Additionally, the FEM 124 of FIG. 1 is arranged so that, in operation, the FEM 124 receives a signal from the GSM/EDGE transceiver antenna 118E and transmits the received signal to the GSM/EDGE transceiver 116. Operation of the FEM 124 of FIG. 1 is facilitated by power received from the power pack 120.

Operation of the FEM 124 of FIG. 1 is facilitated by power received from the multi-tap power pack 120. Notably, the multi-tap power pack 120 may include a single battery (not shown) or include multiple charge storage components as discussed in view of FIGS. 4, 6 and 7.

Conveniently, the traces 312, 314, the multi-tap power pack 120 and the power amplifier 202 form a power amplifier current loop in FIG. 3 that is smaller than the power amplifier current loop that would be formed by traces between the power amplifier 202 and taps 132A and 132B of the power pack 120.

Relatively long power supply traces on a printed circuit board (PCB) are known to occupy PCB real estate and maintain a relatively high Equivalent Series Resistance (ESR), which may be considered detrimental to the efficiency of power supplied by a power pack. A further consequence of the proposed reduced-area power amplifier current loop defined in FIG. 3 is a reduction in length of power supply traces, thereby preserving PCB real estate and reducing the ESR of the power supply traces, leading to an increase in the efficiency of the use of the power from the multi-tap power pack 120.

The FEM 424 of FIG. 4 is arranged, in a manner similar to the FEM 124 of FIG. 1 so that, in operation, the FEM 424 receives a signal from the GSM/EDGE transceiver 116 for transmission on the GSM/EDGE transceiver antenna 118E. Additionally, the FEM 424 of FIG. 4 is arranged, in a manner similar to the FEM 124 of FIG. 1 so that, in operation, the FEM 424 receives a signal from the GSM/EDGE transceiver antenna 118E and transmits the received signal to the GSM/EDGE transceiver 116. Operation of the FEM 424 of FIG. 4 is facilitated by power received from the multi-tap power pack 420.

In operation, the battery identifier portion of the battery identifier and temperature sensor 428 outputs, at the battery ID tap 416, an identification of the multi-tap power pack 420. Additionally, the temperature sensor portion of the battery identifier and temperature sensor 428 senses a temperature within the multi-tap power pack 420 and provides an output signal, at the temperature tap 418, indicative of the temperature to the processor 102.

Significantly, in operation, while drawing power from the second battery 422B, the voltage ripple caused by the FEM 424 operating in pulse mode may be considered to be isolated from the circuits powered by the first battery 422A. Accordingly, circuit complexity may be significantly simplified for the other circuits 104, 106, 108, 110, 112, 114, 116, 122, 126 by reducing the amount of de-coupling components and cutting the cost of some active devices with lower requirement of high power supply rejection ratio.

The FEM 424 of FIG. 6 is arranged, in a manner similar to the FEM 124 of FIG. 1 so that, in operation, the FEM 424 receives a signal from the GSM/EDGE transceiver 116 for transmission on the GSM/EDGE transceiver antenna 118E. Additionally, the FEM 424 of FIG. 4 is arranged, in a manner similar to the FEM 124 of FIG. 1 so that, in operation, the FEM 424 receives a signal from the GSM/EDGE transceiver antenna 118E and transmit the received signal to the GSM/EDGE transceiver 116. Operation of the FEM 424 of FIG. 6 is facilitated by power received from the hybrid power pack 620.

In operation, in the circuit of FIG. 6, the step-down DC-to-DC converter 628 converts the voltage available at the first tap 612B of the supercapacitor 623 to a lower voltage and makes the lower voltage available to the FEM 424. While drawing power from the supercapacitor 623, the voltage ripple caused by the FEM 424 operating in pulse mode may be considered to be isolated from the circuits powered by the battery 622.

Additionally, the supercapacitor charging circuit 621 can act to maintain a more consistent charge on the supercapacitor 623 than is possible to be maintained on the power pack 120 of the power distribution network 100 of FIG. 1.

It may be shown that the ESR of the portion of the power amplifier current loop formed by the combination of the step-down DC-to-DC converter 628 and the hybrid power pack 620 is lower than the ESR of the power pack 120. Experimentation has shown that the ESR of the power pack 120 may be in the order of 150 mΩ, while the ESR of the combination of the step-down DC-to-DC converter 628 and the hybrid power pack 620 may be in the order of only 30 mΩ.

As will be clear to one skilled in the art, the hybrid power pack 620 can be designed with more than one supercapacitor if there is more than one high current load.

Operation of the FEM 424 of FIG. 7 is facilitated by power received from the adapted hybrid power pack 720.

It has been discussed hereinbefore that the pulse mode of power amplifier operation is known to cause a ripple in the power supply voltage provided at a battery and that the ripple may be shown to adversely affect operation of other circuits. It may also be shown that other circuits in a typical mobile communication device can cause a ripple in the power supply voltage. An example of such a ripple-causing circuit is the combination of the LED 732 and the controller 730 in FIG. 7.

In the circuit of FIG. 7, the LED 732 may be used for a flash when using the mobile communication device to capture a still photograph. The LED 732 may also be used as a torch to provide light when the mobile communication device is capturing video. The controller 730 receives power from the fifth tap 734 of the adapted hybrid power pack 720. Additionally, the controller 730 receives instructions from the processor 102 (FIG. 1).

In a typical mobile communication device, the FEM 424 and the LED 732 may not be operated at the same time, due to high pulsed power consumption and the resultant voltage ripples propagating to other circuits. It can be shown that use of the supercapacitor 723, with the step-down DC-to-DC converter 628 and the supercapacitor charging circuit 721, will allow simultaneous operation of the FEM 424 and the LED 732, without causing significant power supply voltage ripples to propagate to other circuits.

The above-described embodiments, and variations thereof, may realize one or more advantages, some of which have been previously mentioned. As noted above, when the power amplifier 202 is not directly electrically coupled to taps 132A and 134A, the voltage ripple caused by the power amplifier can be partially or substantially completely isolated from other circuitry, thereby reducing the effects of the ripple. The performance of some components may be thereby enhanced. Isolation of the ripple from an audio circuit, for example, can result in a reduction of an audible buzz. Electromagnetic interference with some communication channels, such as interference with communication with a T-coil, may be reduced.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A mobile communication device comprising:
   a power amplifier;
   a power pack including:
      a charge storage component;
      a first pair of taps, connected to terminals of said charge storage component, for supplying power to at least an audio circuit of said mobile communication device; and
      a second pair of taps, connected to terminals of said charge storage component, for supplying power to said power amplifier, said second pair of taps located, when said power pack is installed in said mobile communication device, more proximate to said power amplifier than said first pair of taps.

2. The mobile communication device of claim 1 wherein said charge storage component comprises a single rechargeable battery.

3. The mobile communication device of claim 2 wherein said single rechargeable battery is a Lithium Ion battery.

4. The mobile communication device of claim 1 wherein said charge storage component comprises a first rechargeable battery and a second rechargeable battery.

5. The mobile communication device of claim 4 wherein said first rechargeable battery is a Lithium Ion battery and said second rechargeable battery is a Lithium Ion battery.

6. The mobile communication device of claim 1 wherein said charge storage component comprises a capacitor and a rechargeable battery.

7. The mobile communication device of claim 6 wherein said capacitor is a supercapacitor.

8. The mobile communication device of claim 6 wherein said rechargeable battery is a Lithium Ion battery.

9. The mobile communication device of claim 6 further comprising:
   an additional component requiring power;
   wherein said power pack further includes a third pair of taps, connected to terminals of said supercapacitor, for supplying power to said additional component.

10. The mobile communication device of claim 9 wherein said additional component is a Light Emitting Diode.

11. The mobile communication device of claim 10 further comprising a controller associated with, and connected to, said Light Emitting Diode, said controller interposing said Light Emitting Diode and one of said third pair of taps.

* * * * *